Aug. 7, 1923.
1,464,100
M. F. HUTCHISON
AUTOMATIC DAMPER REGULATOR
Filed May 6, 1920    2 Sheets-Sheet 1
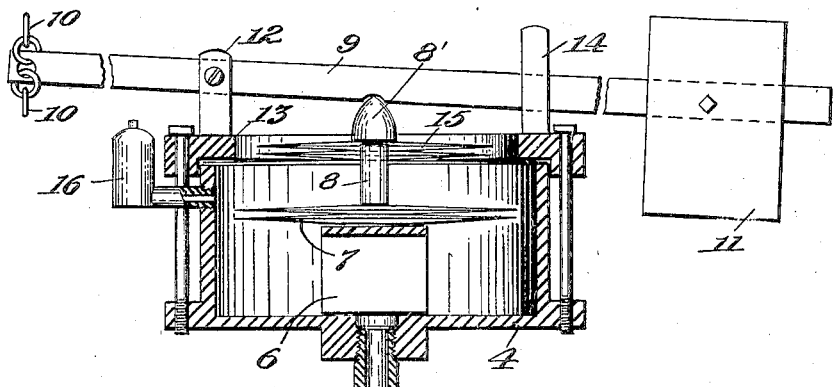
Fig. 1.
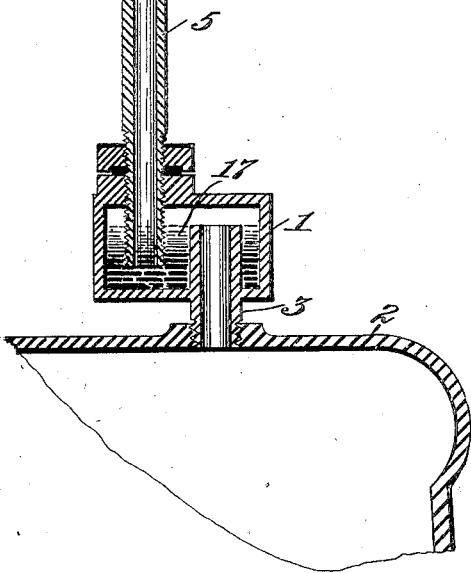
Inventor
Maurice Frank Hutchison,
By Chas. E. Riordan
Attorney

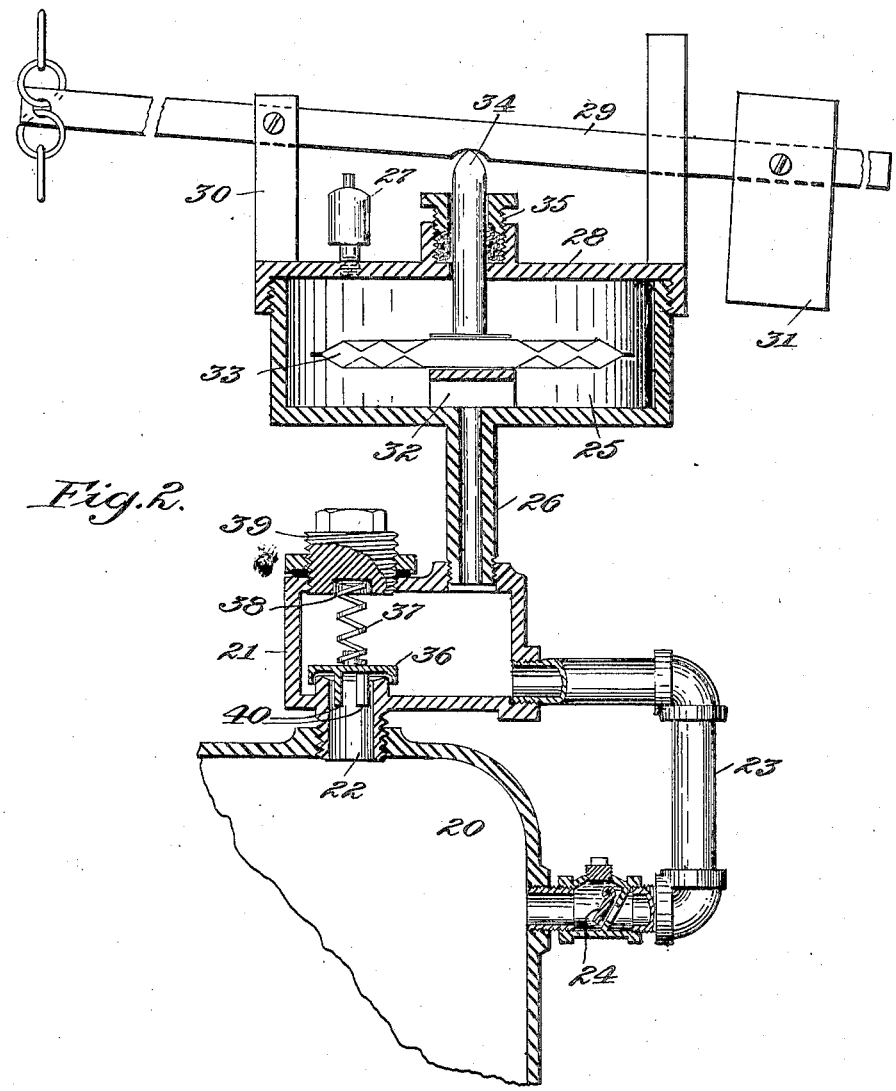

Patented Aug. 7, 1923.

1,464,100

UNITED STATES PATENT OFFICE.

MAURICE FRANK HUTCHISON, OF HERNDON, VIRGINIA, ASSIGNOR TO HUTCHISON REGULATOR COMPANY, OF HERNDON, VIRGINIA, A CORPORATION OF DELAWARE.

AUTOMATIC DAMPER REGULATOR.

Application filed May 6, 1920. Serial No. 379,200.

*To all whom it may concern:*

Be it known that I, MAURICE FRANK HUTCHISON, a citizen of the United States, and a resident of Herndon, in the county of Fairfax and State of Virginia, have invented certain new and useful Improvements in Automatic Damper Regulators, of which the following is a specification.

This invention has for its object the provision of an automatic damper regulator for heating furnaces which will be efficient in operation and durable and inexpensive in construction.

The invention is illustrated in the accompanying drawings and consists in certain novel features which will hereinafter first be fully described and then particularly pointed out in the claims at the end of the description.

In the drawings—

Fig. 1 is a sectional elevation of an embodiment of the invention intended more particularly for use upon a vapor or low-pressure steam heater, and Fig. 2 is a similar view showing a form of the invention adapted for higher pressure steam heaters.

In carrying out my invention I mount a trap or obstruction 1 upon the dome 2 of a furnace boiler, the trap communicating with the steam space of the boiler through a nipple or coupling tube 3, which extends into the trap and has its upper extremity disposed above the bottom of the trap. A receptacle 4 is supported above the trap by a pipe 5, which is secured in the top of the trap and terminates short of the bottom of the trap, but in a plane below the top of the coupling tube 3. Over the upper end of the pipe 5 a bridge or support 6 is provided in the floor of the receptacle or chamber 4 and upon this support is carried a thermostatic member 7. A stud or rod 8 and a pivot rod or point 8′ form a communication between the lever 9 and thermostatic member 7 through a flexible diaphragm 15, said flexible diaphragm forming a steam tight cover for the receptacle and which is secured in place by a ring 13 or by any convenient method. Lever 9 is fulcrumed upon post 12 and a guide 14 prevents lateral movement of said lever. Chains 10 connect lever 9 with dampers in the usual manner and a weight 11 or a spring may be used in connection with said lever which would tend to hold the dampers in an open position. An automatic vent valve 16 of any preferred form is mounted in communication with receptacle 4. The pipe 5 being screw threaded into the trap 1, the volume of the trap may be varied by varying the distance of the bottom of the pipe 5 from the bottom of the trap. By thus varying the volume of the trap the pressure at which the steam or vapor will break through the trap and act on the thermostat is likewise varied, making it possible to obtain various operating pressures according to the requirements of the system to which the regulator may be attached.

The operation will be readily understood. The trap or obstruction 1 is filled with water, as indicated at 17, to the level of the upper end of the tube 3 and the weight 11 if necessary is adjusted along the lever 9 so as to hold the dampers in an open position. The pressure generated by the steam or vapor rises from the boiler through the tube 3 forcing some of the water from the trap into the pipe 5 through which it will rise into the receptacle or chamber 4, the steam following the water into said chamber. The water will be heated through contact with the steam and the heated water and steam will act on the thermostat 7, so as to cause expansion of the same, the air in the chamber being first driven out through the vent valve 16 and said valve then closed through thermostatic action. When the thermostat 7 expands the pin 8 is carried upwardly so as to expand the diaphragm 15 and through the pivot pin or rod 8′ raise the lever 9 against the action of the weight 11 and the dampers are thereby closed so that combustion is retarded. When the steam or vapor supply decreases as a result of the retarded combustion, the water of condensation will return to the trap 1 through the pipe 5 and arrest the flow of steam or vapor to the thermostat and it will be noted that the upper terminal of the pipe does not project above the floor of the receptacle or thermostatic chamber, the draining of the chamber being consequently thorough and complete. When the chamber is drained its temperature falls and the thermostat 7 contracts so that the pin 8 and pivot point 8' descend and the lever 9 returns to its former position and opens the dampers. The former operation will then be repeated and the dampers will continue to open and close automatically as the supply of steam or vapor varies so that the desired temperature will be maintained in the system.

In Fig. 2 is shown an embodiment of the invention more particularly adapted for use in a high pressure apparatus. The dome of the furnace or boiler is indicated at 20 and the receptacle 21 is supported thereon by and communicates therewith through a nipple 22. A pipe 23 leads from the bottom of the receptacle 21 into the boiler to return the water of condensation to the boiler and a check valve 24 in said pipe near the boiler permits flow through the pipe in one direction only as will be readily understood. The thermostatic chamber 25 is supported above the trap by a connection 26, and an automatic vent valve 27 is mounted in the top 28 of or in connection with the chamber, the top in this instance being a rigid plate or cover. The lever 29 is fulcrumed upon a post 30, rising from the cover, is equipped with an adjustable weight 31, and is connected with the dampers in the same manner as the lever in the previously described form is connected. A bridge or bracket 32 in the thermostatic chamber supports a thermostat 33, which carries a pin 34, said pin extending through a packing box 35 to bear against the under edge of the lever 29, as shown. The upper end of the nipple 22 is normally closed by a valve 36, which seats thereon and is held thereto by a spring 37, having its lower bearing on the valve and its upper end seated in a recess 38, in the lower end of the nut 39 which is fitted in the top of the trap. Obviously, by adjusting the nut 39 the tension of the spring 37 may be regulated and the valve thereby set to open at any desired pressure. The valve is illustrated as a disk extending over the end of the nipple and provided with depending guide lugs 40 playing in the nipple but any other feasible construction may be used as preferred.

The operation is substantially the same as that of the first described form. When the pressure of the steam is sufficient to overcome the tension of the spring 37, the valve 36 is unseated and the steam rises to the chamber 25 and expands the thermostat 33, so that the lever 29 is lifted and the dampers closed. As the steam condenses, the water will flow through the pipe 23 into the boiler. When the pressure in the boiler is lowered by the damper being closed, the valve 36 closes, the steam in chamber 25 condenses thereby cooling the thermostat 33 which contracts and dampers open as before. It will be readily understood that the vent valve permits the escape of air from the thermostatic chamber and allows an intake of air to prevent a vacuum being formed in the device.

The device is neither complicated nor expensive, is direct in action, and will function efficiently and automatically as long as a supply of fuel is maintained in the furnace.

Having thus fully described my invention, what I claim as new and desire to secure by Letters Patent of the United States is—

1. A damper regulator comprising an obstruction in communication with a pressure generator, a thermostat exposed to steam or vapor passing through the obstruction, and a damper controlling device operable by the thermostat.

2. A damper regulator comprising a trap for heating fluid, a thermostat, means whereby the heating fluid may pass through the trap to act upon the thermostat, and a damper controlling lever operatively connected with the thermostat.

3. A damper regulator comprising a chamber, a damper controlling lever supported on said chamber, a thermostat within the chamber, a pin rising from the thermostat and engaging the lever, and means for permitting a heating agent to enter the chamber and recede therefrom.

4. A damper regulator comprising a trap, a thermostat chamber supported above the trap and in communication therewith, means for sealing the trap, a thermostat in the thermostat chamber, and a damper controlling device operable by said thermostat.

5. A damper regulator comprising a trap in communication with a boiler, a liquid seal in said trap, a thermostat supported above the trap and exposed to steam or vapor passing therethrough and a damper controlling device operable by said thermostat.

6. A damper regulator comprising a thermostat mounted in a chamber, a passage connecting said chamber with a pressure generator, an obstruction interposed in said passage, means for returning condensation from said chamber to the pressure generator and a damper controlling device operable by said thermostat.

7. A damper regulator comprising a thermostat mounted in a chamber, said chamber having a venting valve in communication therewith, and a passage connecting said chamber with a pressure generator, a variable operative obstruction interposed in said passage, means for disposing of condensation from said chamber and a combustion controlling device operable by said thermostat.

8. A damper regulator comprising a trap in communication with a boiler, a liquid seal in said trap, means for varying the volume of said trap, a thermostat supported above the trap and exposed to steam or vapor passing therethrough, and a damper controlling device operable by said thermostat.

MAURICE FRANK HUTCHISON.